US008684462B2

(12) United States Patent
Brewer et al.

(10) Patent No.: US 8,684,462 B2
(45) Date of Patent: Apr. 1, 2014

(54) FRONT TILT MOTOR GEAR ASSEMBLY AND MECHANISM FOR A POWER SEAT ADJUSTER

(75) Inventors: William Shawn Brewer, Plymouth, MI (US); Ronald R. Siegrist, Grass Lake, MI (US)

(73) Assignee: Johnson Controls Technology Company, Holland, MI (US)

( * ) Notice: Subject to any disclaimer, the term of this patent is extended or adjusted under 35 U.S.C. 154(b) by 170 days.

(21) Appl. No.: 12/997,657

(22) PCT Filed: Jun. 19, 2009

(86) PCT No.: PCT/US2009/048006
§ 371 (c)(1),
(2), (4) Date: Oct. 26, 2011

(87) PCT Pub. No.: WO2009/155544
PCT Pub. Date: Dec. 23, 2009

(65) Prior Publication Data
US 2012/0049597 A1    Mar. 1, 2012

Related U.S. Application Data

(60) Provisional application No. 61/074,449, filed on Jun. 20, 2008.

(51) Int. Cl.
*B60N 2/12*    (2006.01)
*B60N 2/26*    (2006.01)
*B60N 2/28*    (2006.01)

(52) U.S. Cl.
USPC .................................... 297/344.17

(58) Field of Classification Search
USPC ........................................... 297/344.17
See application file for complete search history.

(56) References Cited

U.S. PATENT DOCUMENTS

| 4,331,313 | A | | 5/1982 | Pickles |
| 4,470,318 | A | * | 9/1984 | Cremer et al. ....... 297/344.17 X |
| 4,765,582 | A | * | 8/1988 | Babbs ................... 297/344.17 X |
| 5,707,035 | A | | 1/1998 | Kargol et al. |
| 5,882,075 | A | * | 3/1999 | Partington et al. ... 297/344.17 X |
| 6,264,275 | B1 | * | 7/2001 | Frohnhaus et al. .. 297/344.17 X |
| 6,309,019 | B1 | * | 10/2001 | Downey et al. ...... 297/344.17 X |
| 6,773,069 | B1 | * | 8/2004 | Kaneko et al. ........... 297/344.17 |
| 6,921,058 | B2 | * | 7/2005 | Becker et al. ........ 297/344.17 X |
| 7,066,540 | B2 | * | 6/2006 | Minai et al. .......... 297/344.17 X |
| 7,306,285 | B2 | * | 12/2007 | Schuler et al. ........... 297/344.17 |
| 8,146,991 | B2 | * | 4/2012 | Stanz et al. .............. 297/344.17 |
| 8,177,280 | B2 | * | 5/2012 | Yamada et al. ...... 297/344.17 X |

FOREIGN PATENT DOCUMENTS

| EP | 0759374 A2 | 2/1997 |
| JP | 2008105520 A | 5/2008 |
| WO | WO-2007126757 A1 | 11/2007 |

OTHER PUBLICATIONS

International Search Report dated Aug. 17, 2009; 2 pages.

* cited by examiner

*Primary Examiner* — Rodney B White
(74) *Attorney, Agent, or Firm* — Butzel Long

(57) ABSTRACT

An adjuster mechanism (14) includes a tilt bracket (52), a sector (54), and a motor and transmission assembly (56) and has minimal mass. The adjuster mechanism (14) is useful hi providing adjustability to a vehicle seat (12) for adjusting the front portion of a seat base cushion (16) between a plurality of positions.

14 Claims, 16 Drawing Sheets

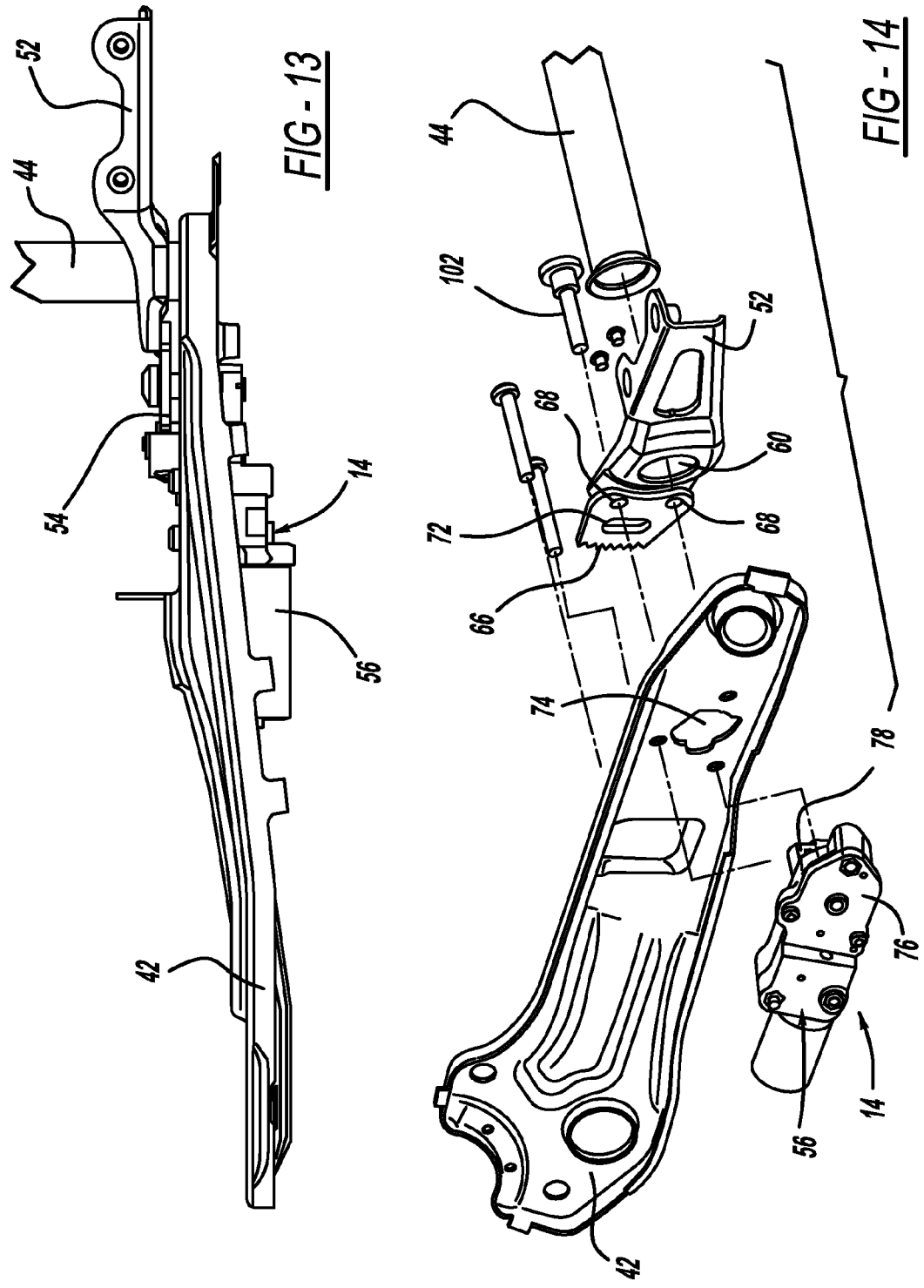

FRONT TILT MOTOR GEAR ASSEMBLY AND MECHANISM FOR A POWER SEAT ADJUSTER

CROSS-REFERENCE TO RELATED PATENT APPLICATIONS

This application claims the benefit of and priority to U.S. Provisional Patent Application No. 61/074,449, filed Jun. 20, 2008, titled: VEHICLE SEAT, in the name of Siegrist et al. which is incorporated by reference herein.

BACKGROUND

The present disclosure relates generally to adjustable seats for use in vehicles. More particularly the present disclosure relates to a mechanism for adjusting the position of the front portion of the seat base.

Generally, it is known to provide adjustable vehicle seats. Further, it is also known to provide an adjustable seat base or cushion of a vehicle seat in a first row seating application as well as in a single occupant vehicle seat such as a "captain's chair." The angularly adjustable base or cushion allows an occupant to obtain a more comfortable seating position. Generally, a tilt mechanism is known for providing seat base front portion (or lip) angular adjustment. One example of a known seat adjuster is shown in FIGS. 29 through 31 wherein a conventional, bell crank type adjuster device is shown for use in adjusting a portion of a vehicle seat base. The generally known adjuster device of FIGS. 29 through 31 includes a generally L-shaped, bell crank bracket connected to a cross-tube and a motor. The motor includes a transmission and a driver member connected to one end of the bell crank bracket. As the driver member of the motor moves in one direction it moves one leg of the bell crank member causing the cross tube to pivot and thereby moving the other leg of the bell crank bracket. The other leg of the bell crank bracket is connected to the front portion of the seat base cushion of the vehicle seat. The adjuster device of FIGS. 29 through 31 is designed to adjust the front portion of the seat base cushion of the vehicle seat. The bell crank design and method may be used for independent, front and rear lifts or for entire seat lift through a 4-bar linkage design. Other methods include using a pinion and sector lift for independent front and rear lift, or complete seat lift through a 4-bar linkage method. When the complete seat lift through a 4-bar linkage method is used, it is desirable to have, in addition to the lift, an adjustable thigh support. In all known cases with an adjustable thigh support, the adjustment is accomplished by using one of the standard lift motors and gear boxes, which are over designed for the actual strength and lift capacity requirements for a thigh support adjustment.

There remains a significant and long-continuing need to provide improved adjusters and mechanisms that provide greater performance and competitive advantages than compared to the known vehicle seat adjuster systems. In particular it would be quite advantageous to provide an improved adjuster for a vehicle seat that has lower mass and requires less space while providing suitable performance for use in a vehicle seat application.

SUMMARY

Generally, a seat base has a seat frame member having first and second side frame members each having first and second ends, an adjuster mechanism for upward and downward adjustment of the front portion of the seat base. The adjuster mechanism includes a motor for generating torque, a first gear engaging the motor, a second gear engaging the first gear, a rotable shaft extending perpendicularly through the first side frame member and engaging the second gear, and a tilt bracket coupled to the rotatable shaft and to the front portion of the seat base. Torque generated by the motor is transferred (via a transmission connected to the motor) to the first and second gears to rotate them and thereby transfer torque from the first and second gears to the rotatable shaft which rotates in a first direction and causes the tilt bracket to rotate in a second direction to thereby adjust the front portion of the seat base. In one exemplary embodiment, the adjuster mechanism has an axial extent coupled to the first end of the first side frame member and the adjuster mechanism is aligned to have its axial extent aligned with and parallel to the axial extent of the first side frame member and located toward the front portion of the seat base.

An exemplary embodiment of the present disclosure relates to an improved vehicle seat adjuster mechanism for adjusting the front portion of the seat base cushion between a plurality of positions from a lower or down position to a raised or upper position. The adjuster mechanism includes, inter alia, a tilt bracket, a sector, and a motor and transmission assembly and has minimal mass. The adjuster mechanism provides a more compact and streamlined design so that the adjuster mechanism occupies less space and may be installed in a variety of locations, such as the side of the vehicle seat base.

BRIEF DESCRIPTION OF THE DRAWINGS

The foregoing and other features of the exemplary embodiments will become more apparent to one skilled in the art upon consideration of the following detailed description and the accompanying drawings in which:

FIG. 13 is a partial, plan view of the seat base of FIG. 8 further detailing the front seat portion adjuster according to the present disclosure;

FIG. 14 is a partial, exploded perspective view of the seat base of FIGS. 8-13 detailing the front seat portion adjuster according to the present disclosure;

DETAILED DESCRIPTION

Figure 1:
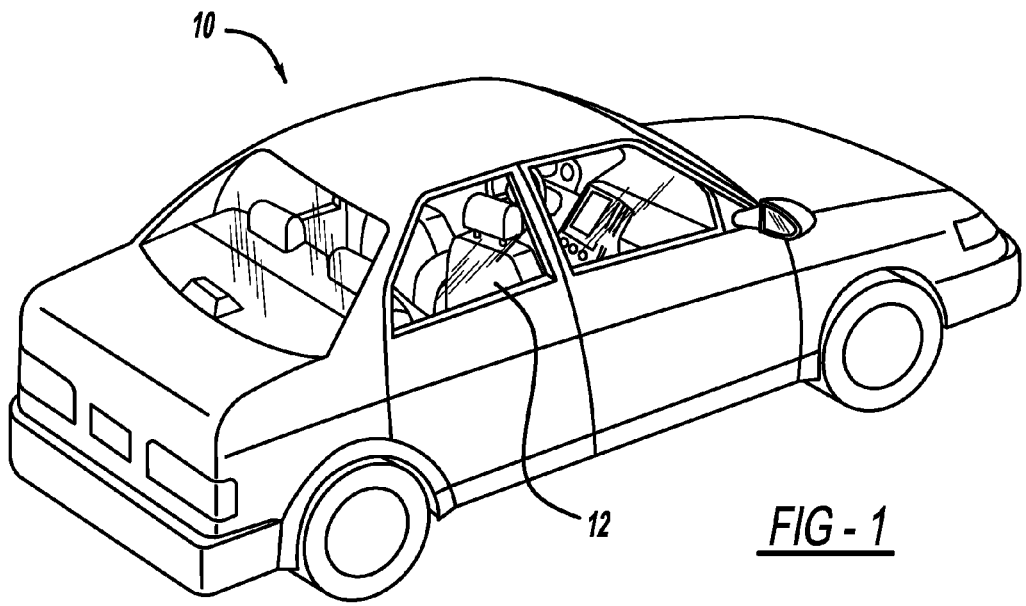
FIG. 1 is a perspective view of a vehicle including a vehicle seat including a vehicle seat actuator mechanism according to the disclosed exemplary embodiment.
Figure 2:
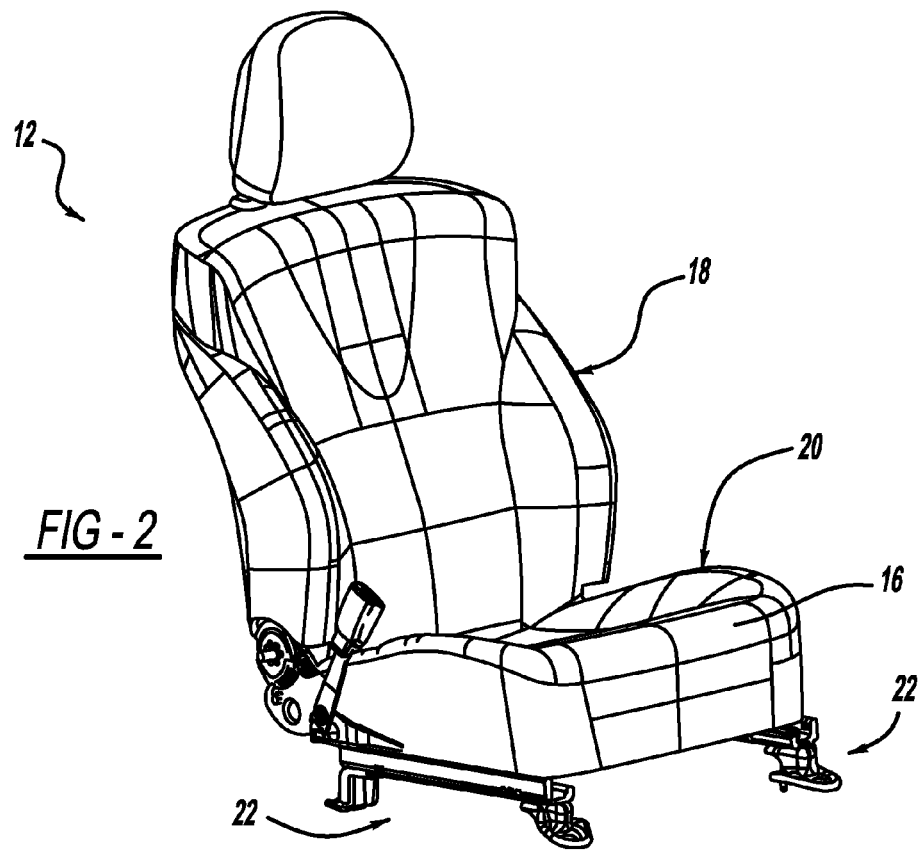
FIG. 2 is a perspective view of the vehicle seat of the vehicle of FIG. 1 according to the disclosed exemplary embodiment.
Figure 3:
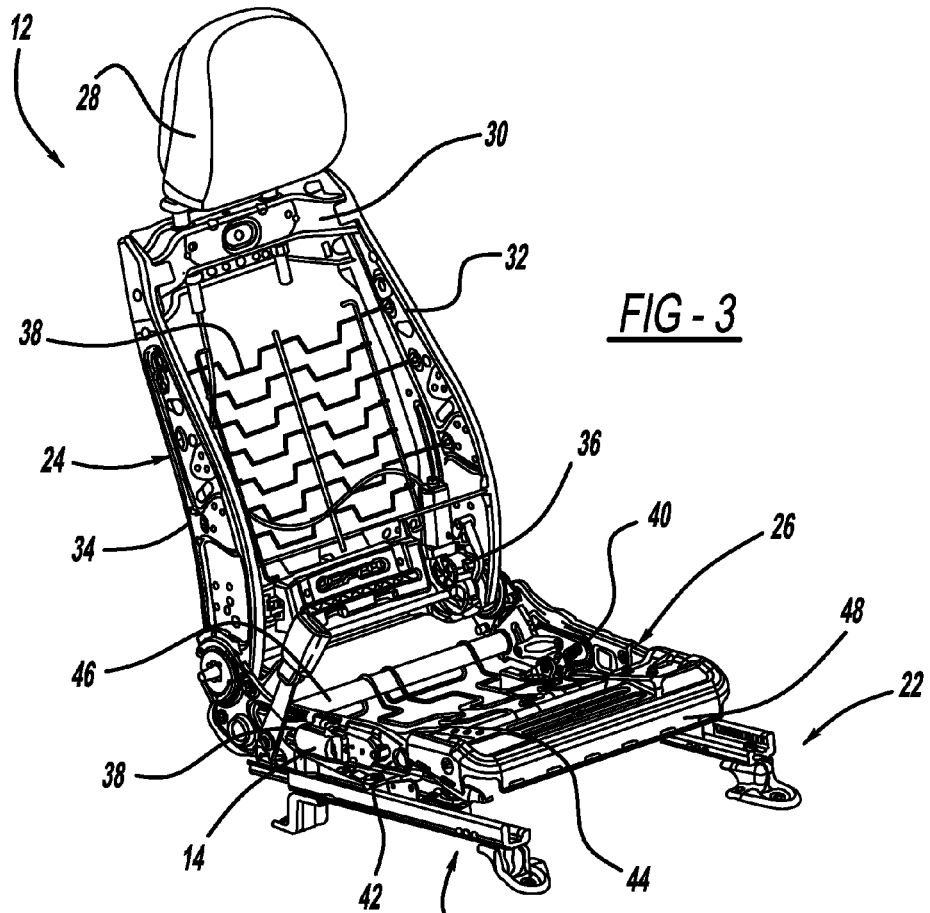
FIG. 3 is a perspective view of the vehicle seat of FIG. 2 with the seat trim covers and foam removed disclosing the seat frame and structures according to the present disclosure.
Figure 4:
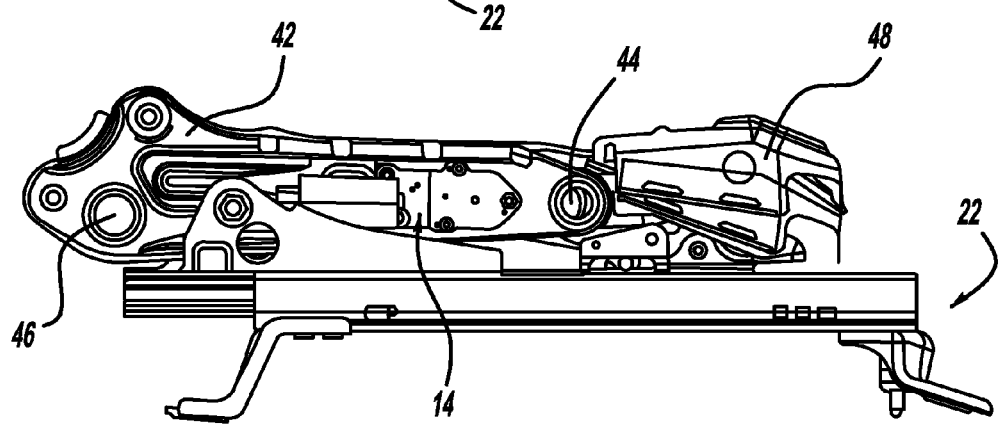
FIG. 4 is a side view of the seat base and track assembly of the vehicle seat of FIG. 3 showing an adjustable front seat portion in first and second positions according to the present disclosure.
Figure 5:
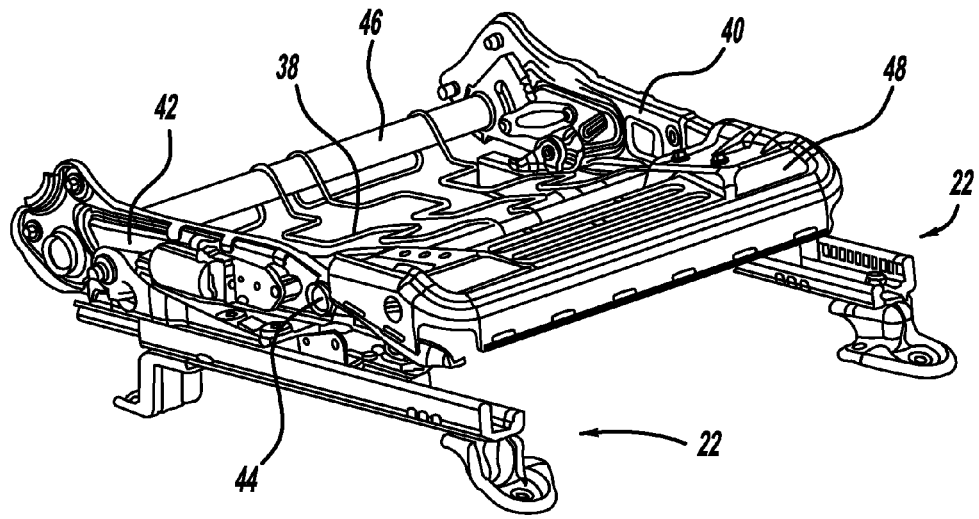
FIG. 5 is a perspective view of the seat base and track assembly of FIG. 4 according to the present disclosure.
Figure 6:
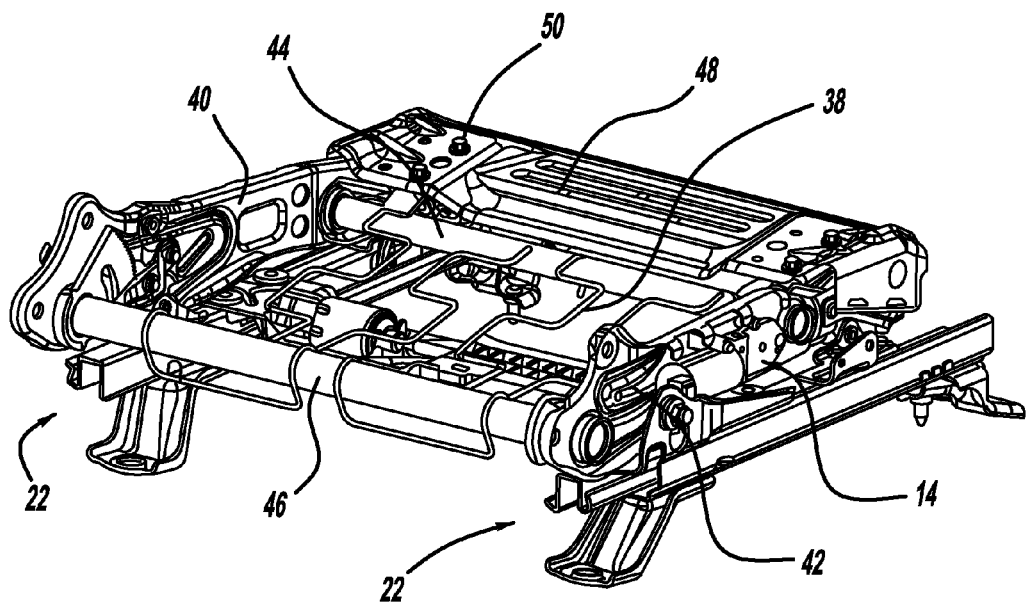
FIG. 6 is an alternate perspective view of the seat base and track assembly of the vehicle seat of FIG. 3 according to the present disclosure.
Figure 7:
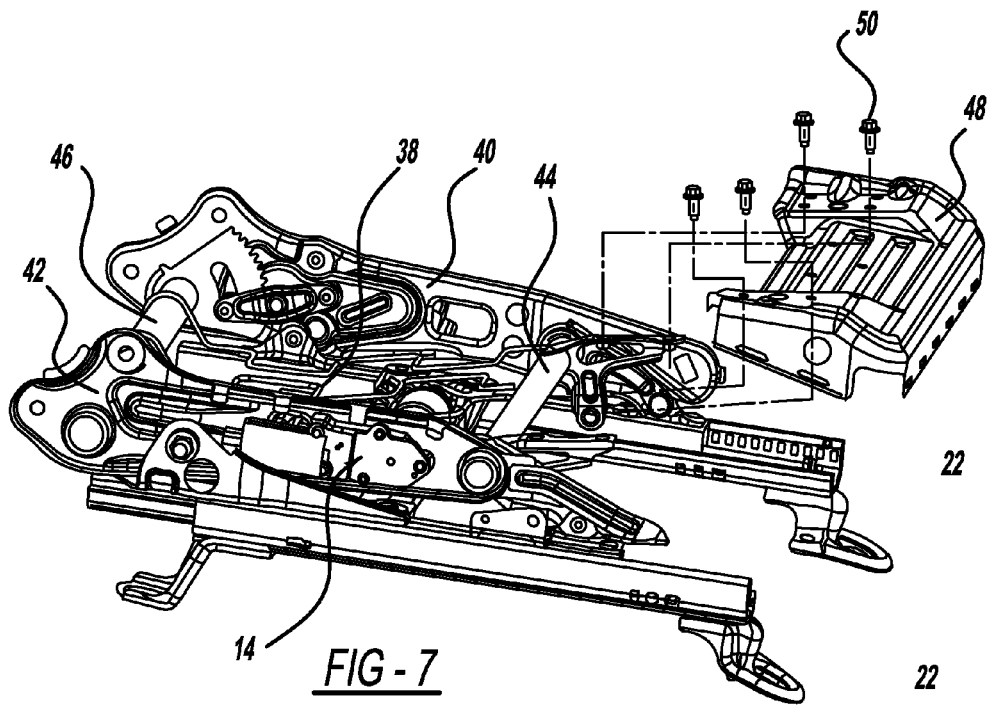
FIG. 7 is a further alternate, partially exploded perspective view of the seat base and track assembly according to the present disclosure.
Figure 8:
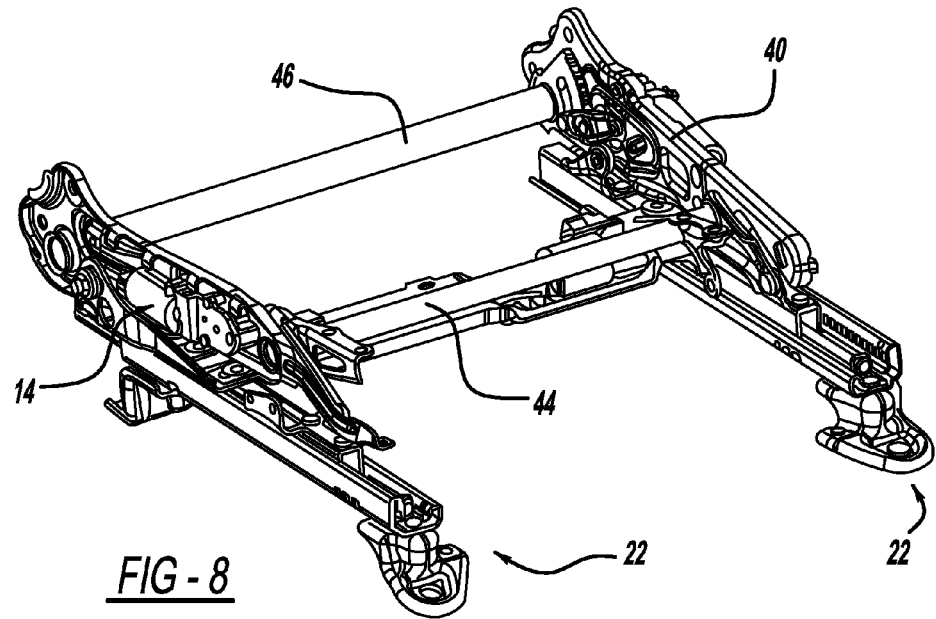
FIG. 8 is a further alternate perspective view of the seat base and track assembly of FIG. 3 with the front seat pan portion removed disclosing a front seat portion adjuster according to the present disclosure.
Figure 9:
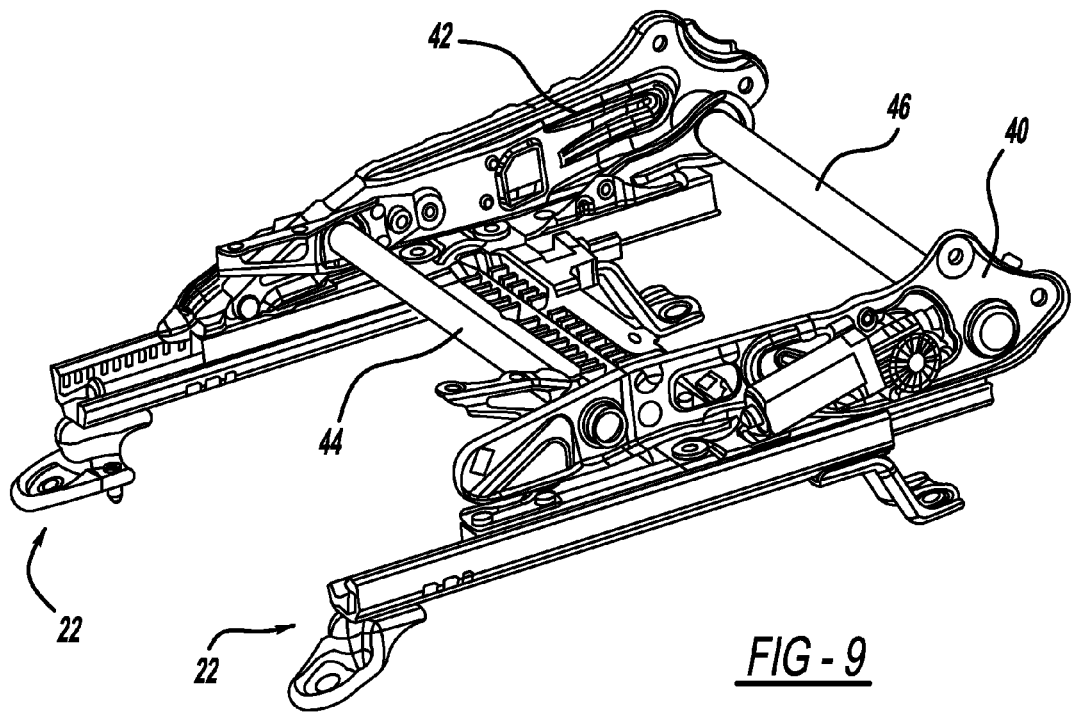
FIG. 9 is a further alternate perspective view of the seat base and track assembly of FIG. 8 according to the present disclosure.
Figure 10:
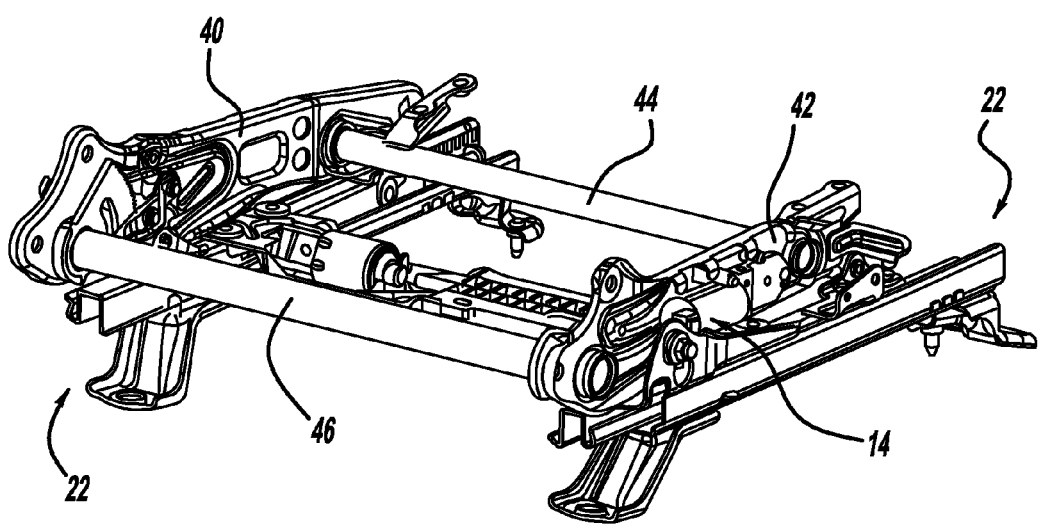
FIG. 10 is a further alternate perspective view of the seat base and track assembly of FIG. 8 according to the present disclosure.
Figure 11:
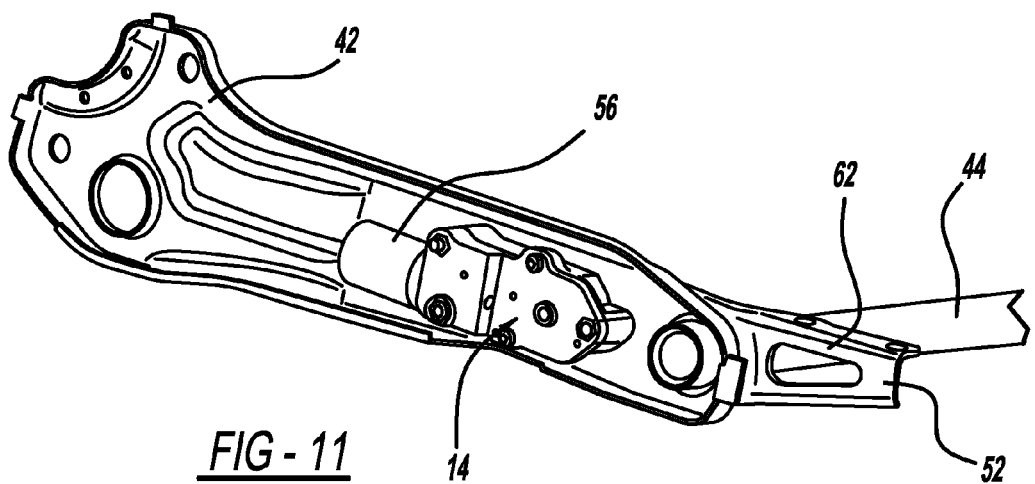
FIG. 11 is a partial, perspective view of the seat base of FIG. 8 further detailing the front seat portion adjuster according to the present disclosure.

Referring generally to FIGS. 1 through 28; exemplary embodiments of an adjuster mechanism for use in a vehicle seat 12 are disclosed. In particular, the adjuster mechanism 14 is particularly useful in a vehicle seat 12 such as shown in FIGS. 2 and 3 for use in a vehicle 10 as shown in FIG. 1. While a single occupant type seat 12 and a generally sedan-type vehicle 10 are shown, it should be appreciated that the adjuster mechanism 14 as disclosed may be adapted to be used in most any type of seat architecture and in most any type of seat and vehicle where it is desirable to be able to provide adjustability including to adjust the front portion of a seat cushion. Further, the adjuster mechanism 14 may also be adapted to adjust other portions of the vehicle seat 12.

The adjuster mechanism 14 is particularly useful for adjusting the front portion of the seat base cushion 16. The adjuster mechanism 14 adjusts the front portion of the seat base cushion 16 between a plurality of positions including its greatest extent, a first or lowered position and a second or raised position. The vehicle seat 12 of FIG. 2 is shown including its trim cover 18 and foam cushions 20 and an adjustable track assembly 22 for adjusting the fore-aft position of the vehicle seat within the passenger compartment of the vehicle of FIG. 1.

The vehicle seat 12, as shown in FIG. 3, includes a seat back frame 24 and its related components and a seat base 26 and its related components. The seat back frame 24 includes a head restraint 28 connected to an upper frame cross member 30, a pair of side frame members 32, 34 and a lower cross frame member 36. The seat back 24 and seat base 26 each include a plurality of springs 38 extending across the frames 24, 26 for supporting the foam cushion 16 of the vehicle seat 12.

The seat base 26, as shown in FIGS. 3 through 10 includes a pair of side frame members 40, 42 and a first (forward) cross tube member 44 and a second (rear) cross tube member 46. Referring in particular now to FIGS. 3 through 7, the seat base 26 includes a front seat pan portion 48 in the form of a generally, thin layer member extending between the side members 40, 42 and positioned at the forward part of the seat base 26. The front seat pan portion 48 provides support for the occupant of the vehicle seat 12 and supports the foam cushion material 20 and the trim cover 18. The front seat pan portion 48 is connected to the seat base 26 using a plurality of fasteners 50 such as the screws shown but may also be connected using any known or appropriate connector.

An exemplary embodiment of the adjuster mechanism 14 for use in the vehicle seat 12 as disclosed is shown in FIGS. 11 through 14. The adjuster mechanism 14 includes a tilt bracket 52, a sector 54, and a motor and transmission assembly 56 connected to a side bracket of the seat base 26. The tilt bracket 52 of the adjuster mechanism 14 includes a central portion 58 having a passage or hole 60 for connection of the tilt bracket 52 to the cross (or torsion) tube 44 of the seat base 26. The cross tube 44 is rotatably connected to the side bracket 42 of the seat cushion 26 using any known or appropriate connection. The tilt bracket 52 further includes a first end or portion 62 for connection to the front seat pan portion 48 and a second end or portion 64 for driving rotation of the tilt member and the cross tube member 44.

Figure 12:
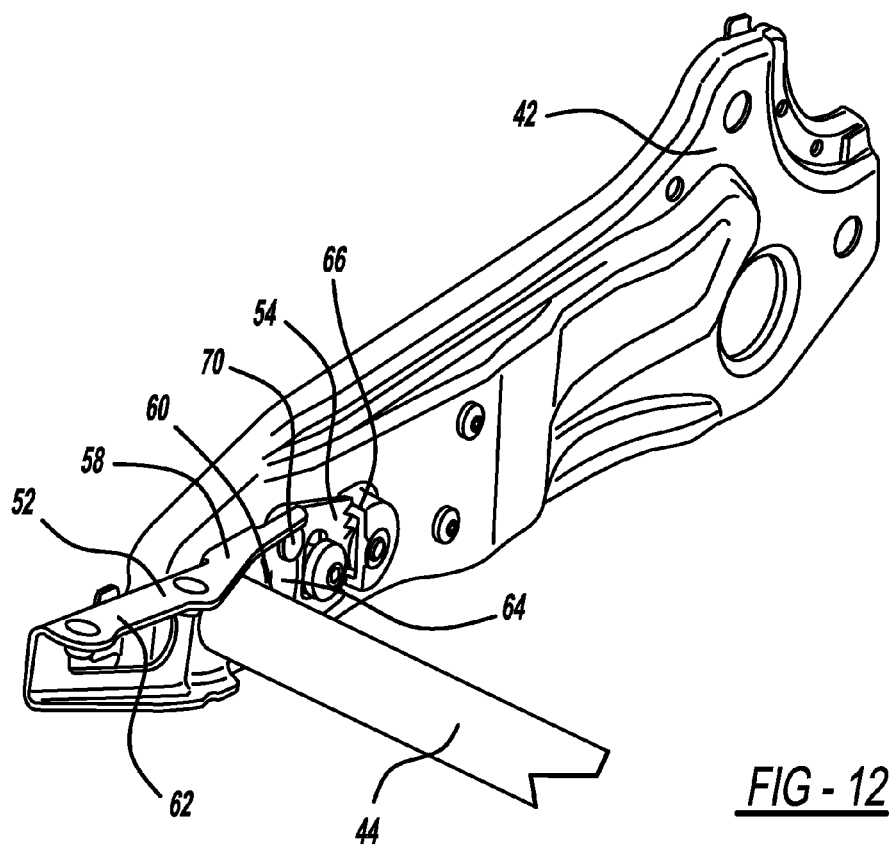
FIG. 12 is a partial, alternate perspective view of the seat base of FIG. 8 according to the present disclosure.
Figure 15:
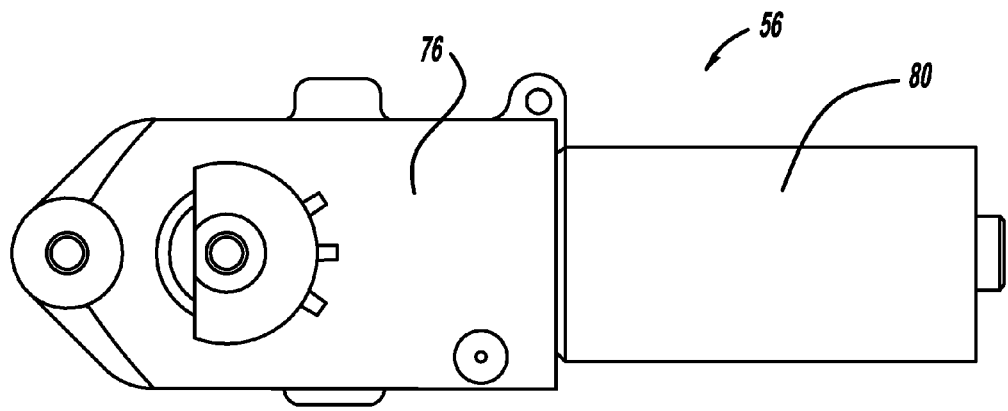
FIG. 15 is a plan view of a motor and transmission assembly disclosed in the front seat portion adjuster in the seat base shown in FIGS. 8-14.
Figure 16:
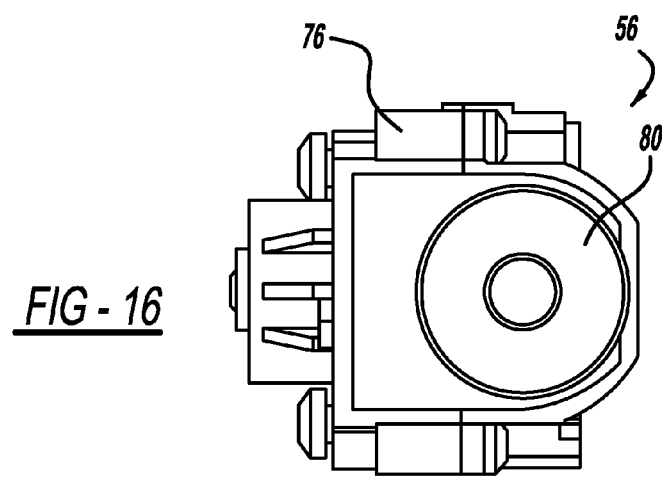
FIG. 16 is an alternate plan view of the motor and transmission assembly shown in FIG. 15.
Figure 17:
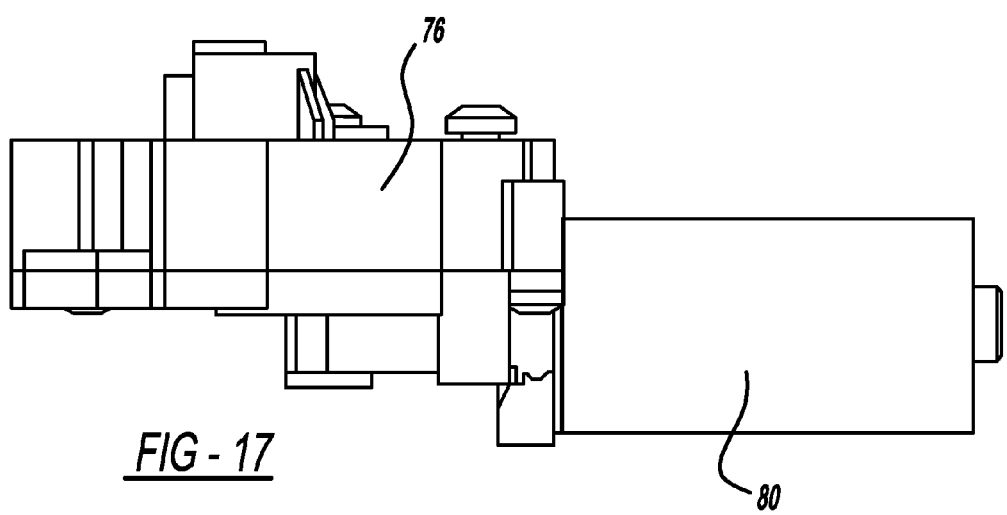
FIG. 17 is a further alternate plan view of the motor and transmission assembly shown in FIG. 15.

The sector 54 is a relatively, flat formed member that is fastened to one end of the tilt bracket 52 but may alternatively be integrated or unitary with the tilt bracket 52. The sector member 54 includes a plurality of teeth (or other engaging members) 66 along one end portion thereof and a pair of holes 68 located along a second end portion thereof for connecting the sector 54 to the tilt member using a connector 70. The sector member 54 further includes a passage 72 located in a central portion thereof. The sector member 54 is preferably made from any metal (preferably relatively high strength steel) and is formed in a stamping procedure or a stamping plus broach procedure. The tilt bracket 52 and sector 54 are positioned towards center of seat 12 as close as possible to the inboard side bracket 42 of the seat base 26 and the motor and transmission 56 are positioned on the inboard of vehicle side of the seat bracket 42 as best shown in FIGS. 12 and 13. Optionally the motor and transmission 56 may be located on the outboard side of the seat 12 if packaging room is available. A second passage or hole 74 aligned relative to the hole of the cross tube member 60 is located to have the transmission 76 and its output member 78 aligned with the engaging portion of the sector 54. The motor and transmission 56 are designed and arranged as an elongated package and to substantially fit within the side bracket member 42 of the seat base 26 and to have a relatively low profile as shown in FIGS. 15 through 17.

Figure 27:
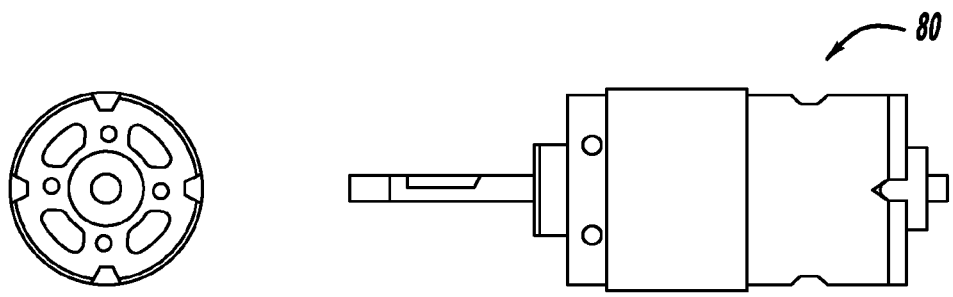
FIG. 27 is a front and side view of a micro motor as intended for use in the innovation according to the present disclosure.

A suitable micro motor 80, as shown in FIG. 27, having approximately 10% stall torque of the standard motors presently used (shown in FIG. 26) may be incorporated into the motor and transmission assembly 56 of the adjuster mechanism 14. A suitable motor 80, when coupled with the transmission 76 should have an output torque at the pinion for loaded condition of at least sufficient strength and speed to lift the thigh support to its upper most position in the fully loaded condition within 4 to 7 seconds. To obtain the lowest possible pricing, the micro motor 80 should be chosen from high volume production choices where free speed, running speed and running torque will work with the transmission gearing to meet the output speed and torque required for the adjustment of the thigh support pan 48. The micro motor 80 should also have sufficient stall torque variance from the running torque so that environmental conditions or high load conditions do not cause loss of function. One example of such a suitable micro motor 80 has a free speed of 4,900 rpm, a normal load speed of 3,010 rpm with 0.016 Nm torque and 0.038 Nm stall torque. The micro motor 80 should also be capable of housing EMC (electromagnetic compatibility) components (as well as other components, such as, internal Hall Effect measurement components for memory functions, etc.) to meet all original equipment manufacturing (OEM) and/or application specific requirements.

Unlike other known seat adjuster mechanisms, the seat adjuster of the present disclosure 4 has significantly lower mass, requires significantly less installation space, and has a significantly lower manufacturing cost. As such, the seat adjuster of the present disclosure 4 provides greater performance and competitive advantages over the other known seat adjuster mechanisms. Whereas the mass of known seat adjuster tilt mechanisms range from 0.44 to 1.40 Kg, the mass of the seat adjuster mechanism of the present disclosure 4 is approximately 0.275 Kg—a mass reduction of approximately 38% over the lightest known seat adjuster tilt mechanism. Further, known seat adjuster mechanisms have a DFC range of 10.00 to 16.00, whereas the seat adjuster mechanism of the present disclosure 4 has a DFC of approximately 8.00 significantly less than the least cost known seat adjusters.

Figure 18:
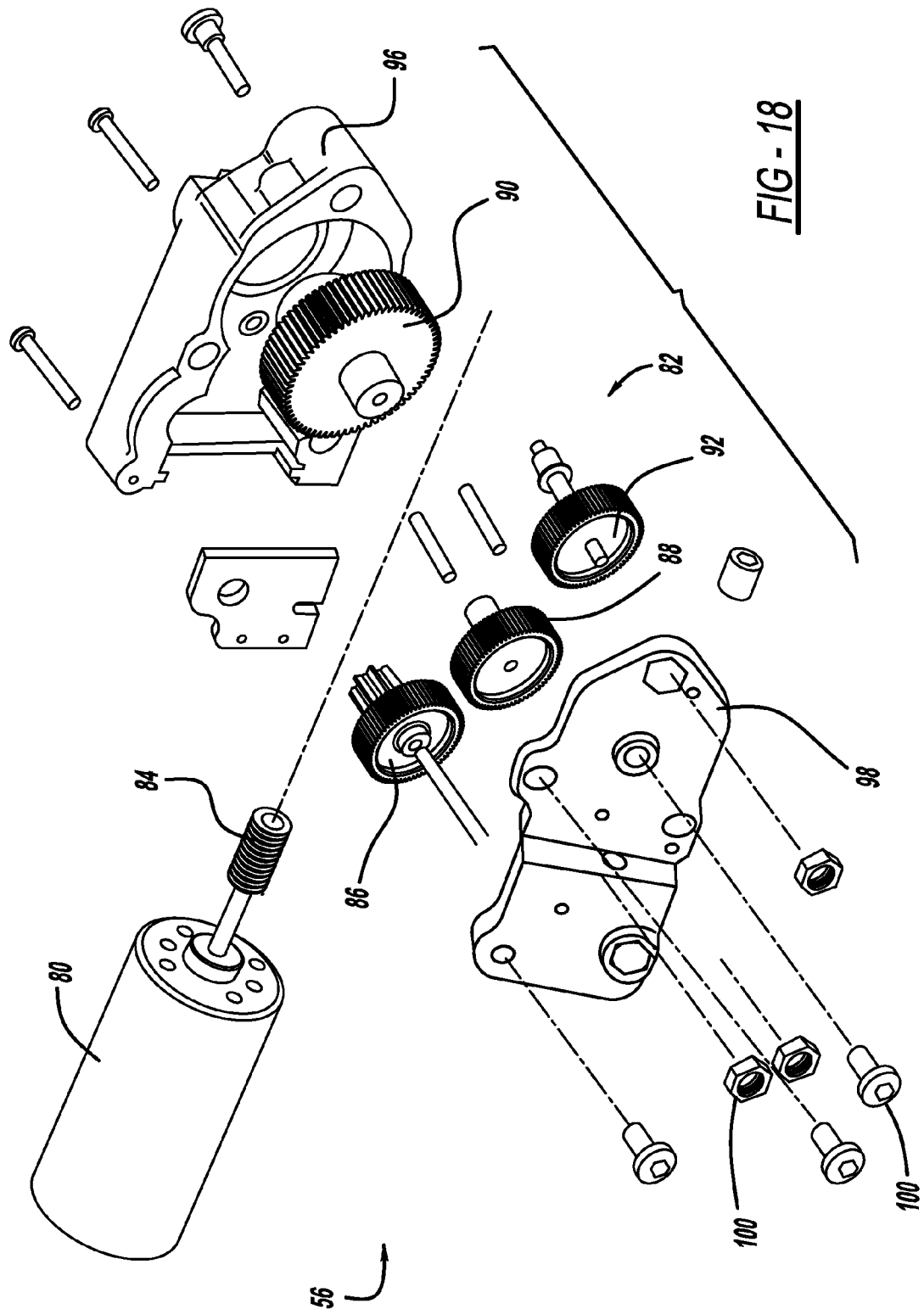
FIG. 18 is an exploded perspective view of the motor and transmission assembly shown in FIG. 15.
Figure 19:
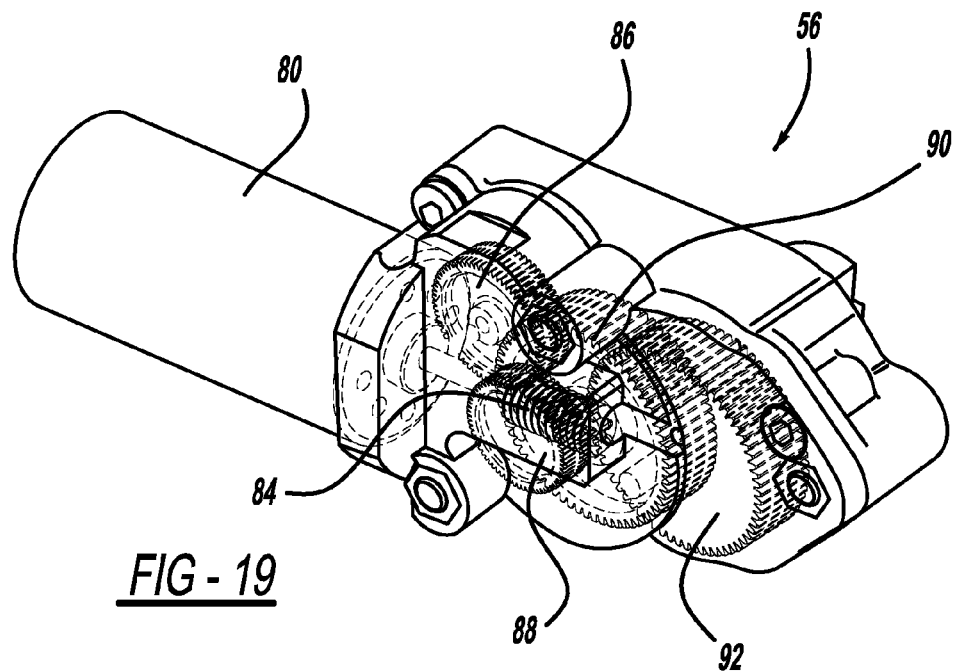
FIG. 19 is an alternate perspective view of the motor and transmission assembly shown in FIGS. 15-18 further detailing the gear train arrangement of the adjuster device.
Figure 20:
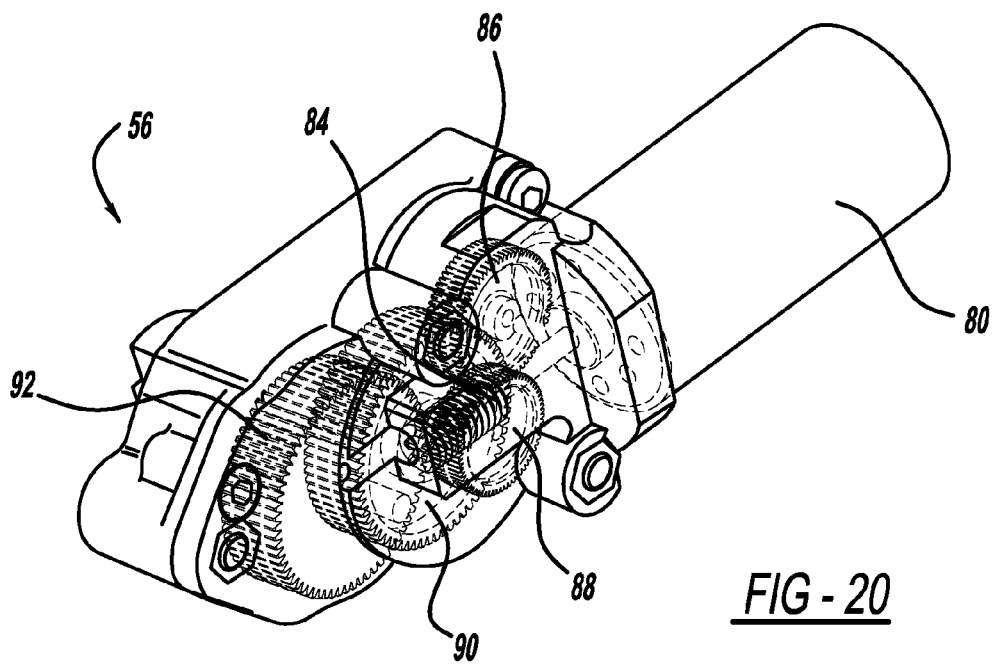
FIG. 20 is an alternate perspective view of the motor and transmission assembly shown in FIG. 19 further detailing the gear train arrangement of the adjuster device.

As best shown in FIGS. 18 through 20, the transmission 76 includes a gear train 82 having a worm gear 84, three driving gears 86, 88, 90 and a pinion gear 92. The gear train 82 transfers the torque generated by the motor 80 and applied to the worm gear 84 to the pinion gear 92 which engages the teeth (or other engagement portion) 66 of the sector member 54 to cause the tilt member 52 and cross tube 44 to rotate in the passage in the side bracket member 42.

Figure 28A:
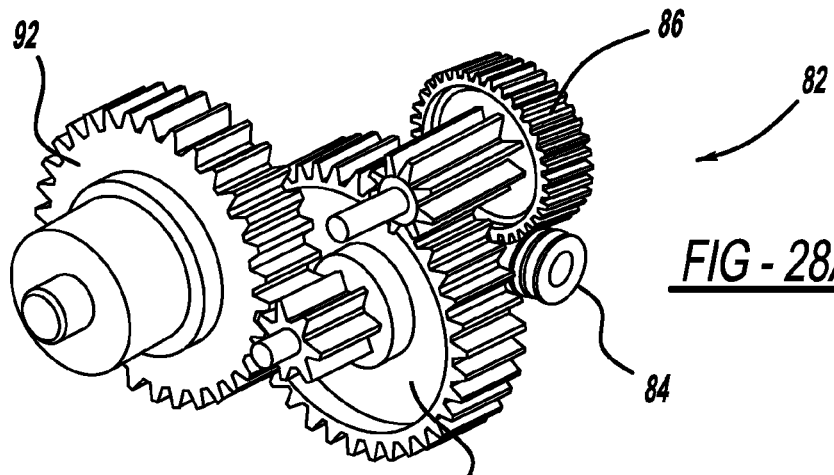
FIGS. 28A and 28B are exploded perspective views of the gear system of the adjuster device.
Figure 28B:
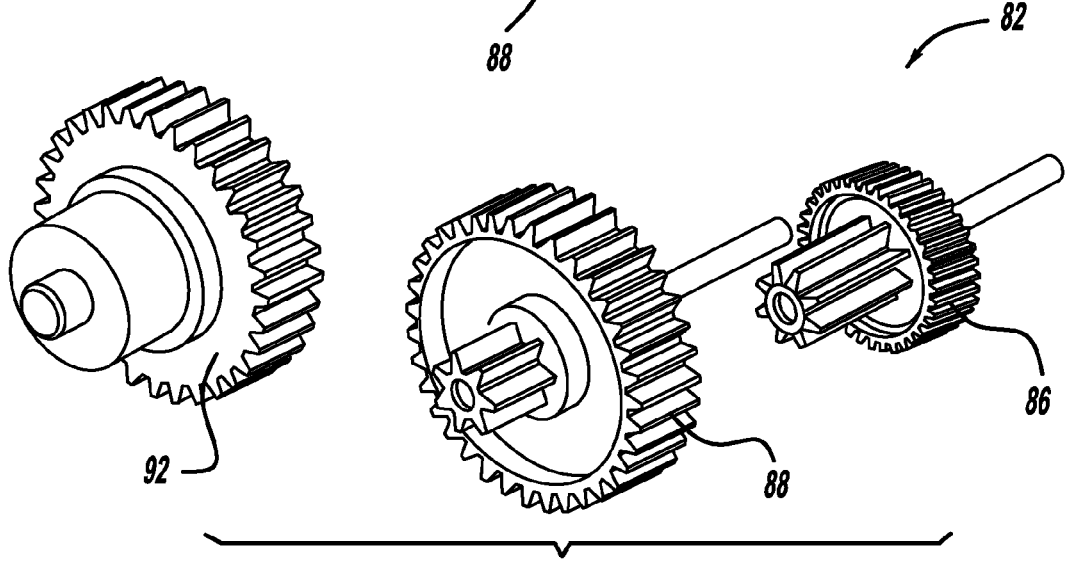
Figure 29:
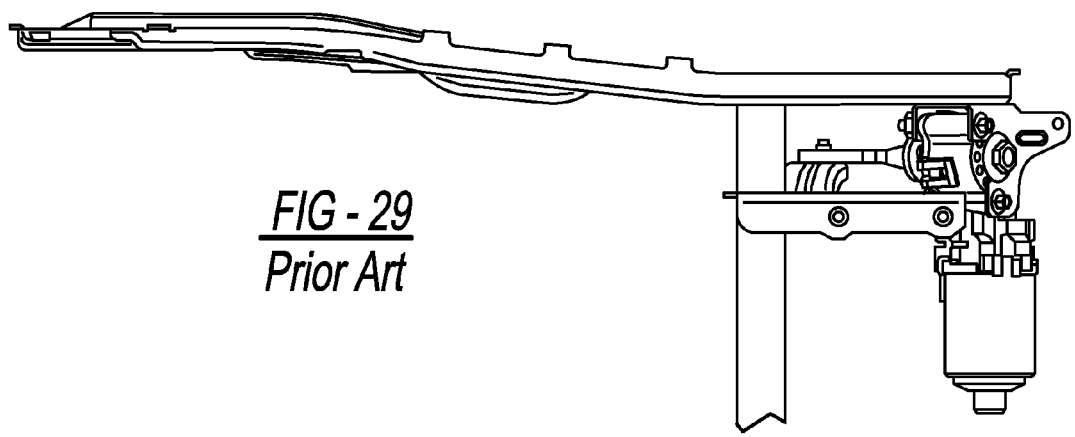
FIG. 29 is partial, plan view of a seat base including a prior art, front seat portion adjuster device.
Figure 30:
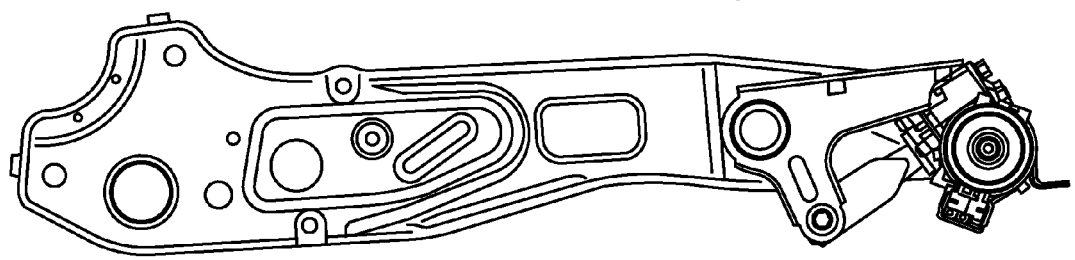
FIG. 30 is partial, alternate plan view of the seat base including the prior art, front seat portion adjuster device of FIG. 24.
Figure 31:
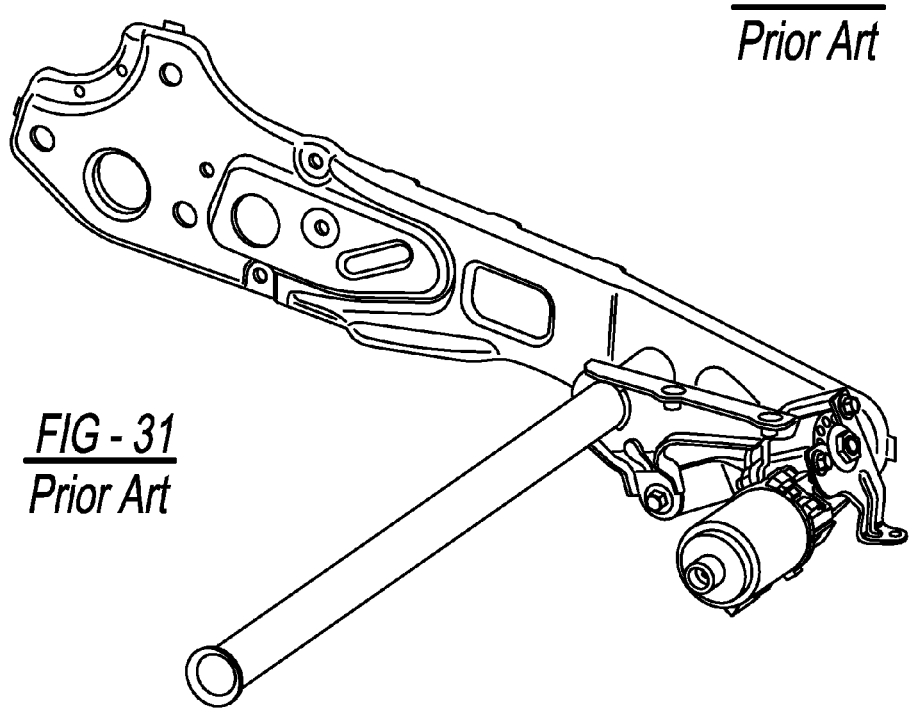
FIG. 31 is a partial, perspective view of the seat base including the prior art, front seat portion adjuster device of FIG. 24.

Referring now to FIG. 28, the details of the gear system 94 of the adjuster mechanism 14 are shown. The gear system 82 may be comprised of a plurality of gears (e.g., 3 or 4 gear sets) 86, 88, 92. According to an exemplary embodiment, the gear system 82 includes a first gear 86, second gear 88, a pinion gear 92, and a worm gear 84. The worm gear 84 can be made from either brass or steel, the worm gear 84 and its integral drive gear 86 are made from plastic, the second stage driven gear 88 is made from plastic which is either over molded or pressed onto the drive gear 88, for the third stage, where the drive gear 88 is either made from a sintered iron, otherwise known as powdered metal or pressed metal, or it may be made from steel, and the driven portion of the third stage is integrally made with the output pinion gear 92 is preferably made from a metal material such as sintered iron or steel. The gear train 82 is located in gear housing 94 having a first or inner half housing portion 96 and an outer half housing portion or cover 98. The gear housing 94 is connected to the outboard side of the side bracket member 42 using a plurality of fasteners 100 but may be connected using any known or appropriate connector device. When the gear housing 94 is connected to the side bracket member 42, the pinion gear 92, extending from the gear housing 94, has at least a portion thereof that extends through the hole in the side bracket member 42 toward the inboard side of the side bracket member 42 and engages the sector 54. When the motor 80 is energized in a first direction to rotate the gear train 82, the pinion gear 92 rotates in a first direction causing the sector 54 and the tilt member 52 to rotate in an opposite direction causing the front seat pan portion 48 to move.

Figure 21:
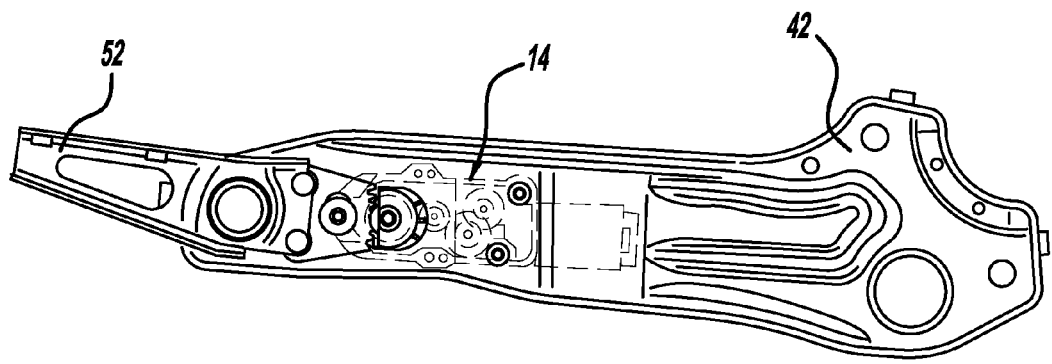
FIGS. 21 through 23 are a progression of an alternate, plan views of the seat base and adjuster device as shown in FIG. 14 showing the front seat portion in a first or design position (FIG. 21), a second or full down position (FIG. 22), and a third or full up position (FIG. 23)
Figure 22:
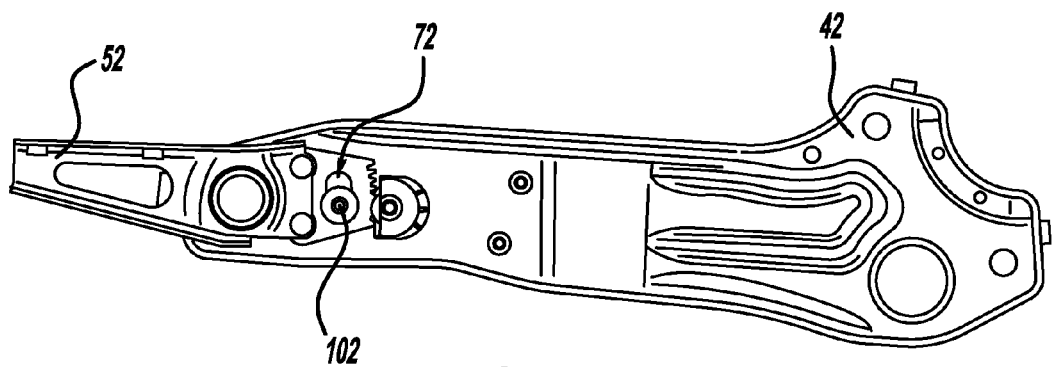
Figure 23:
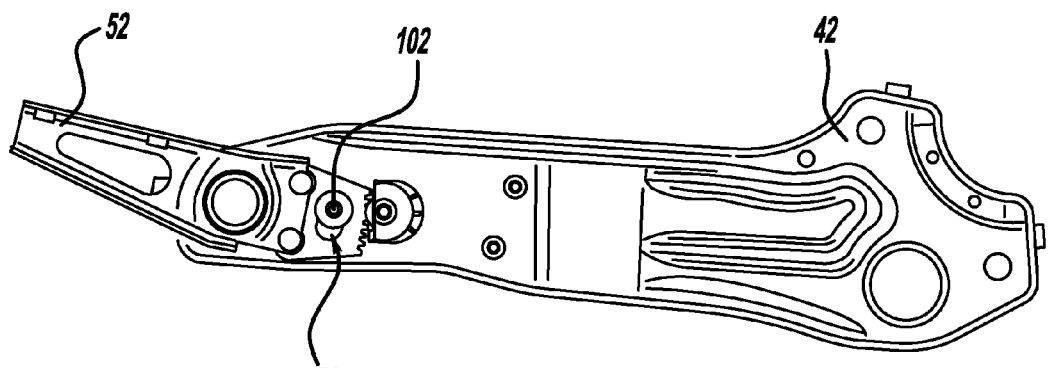
Figure 24:
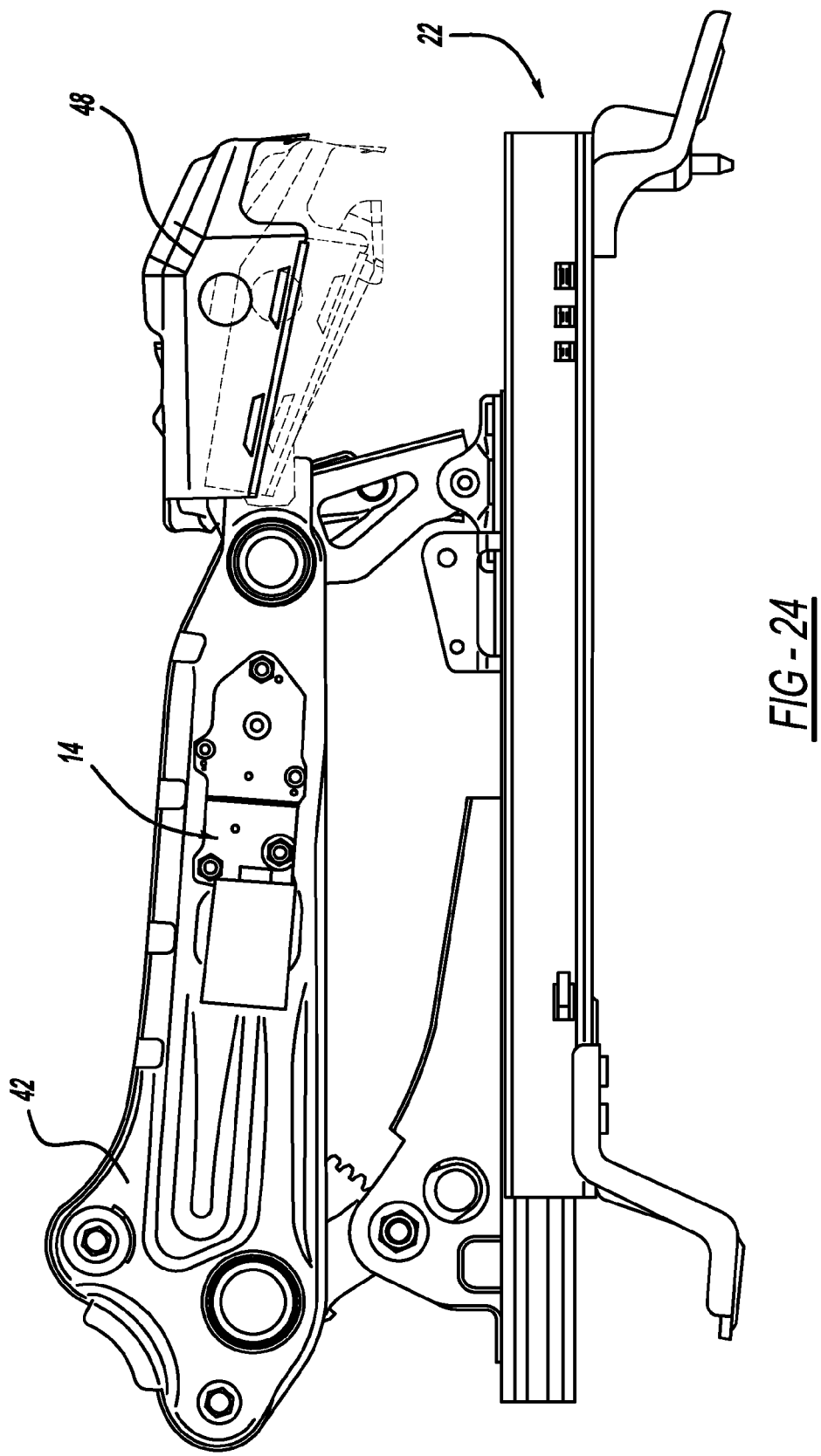
FIG. 24 is a side view of a seat adjuster in the full up position with the tilt pan shown in both the full up and full down positions.
Figure 25:
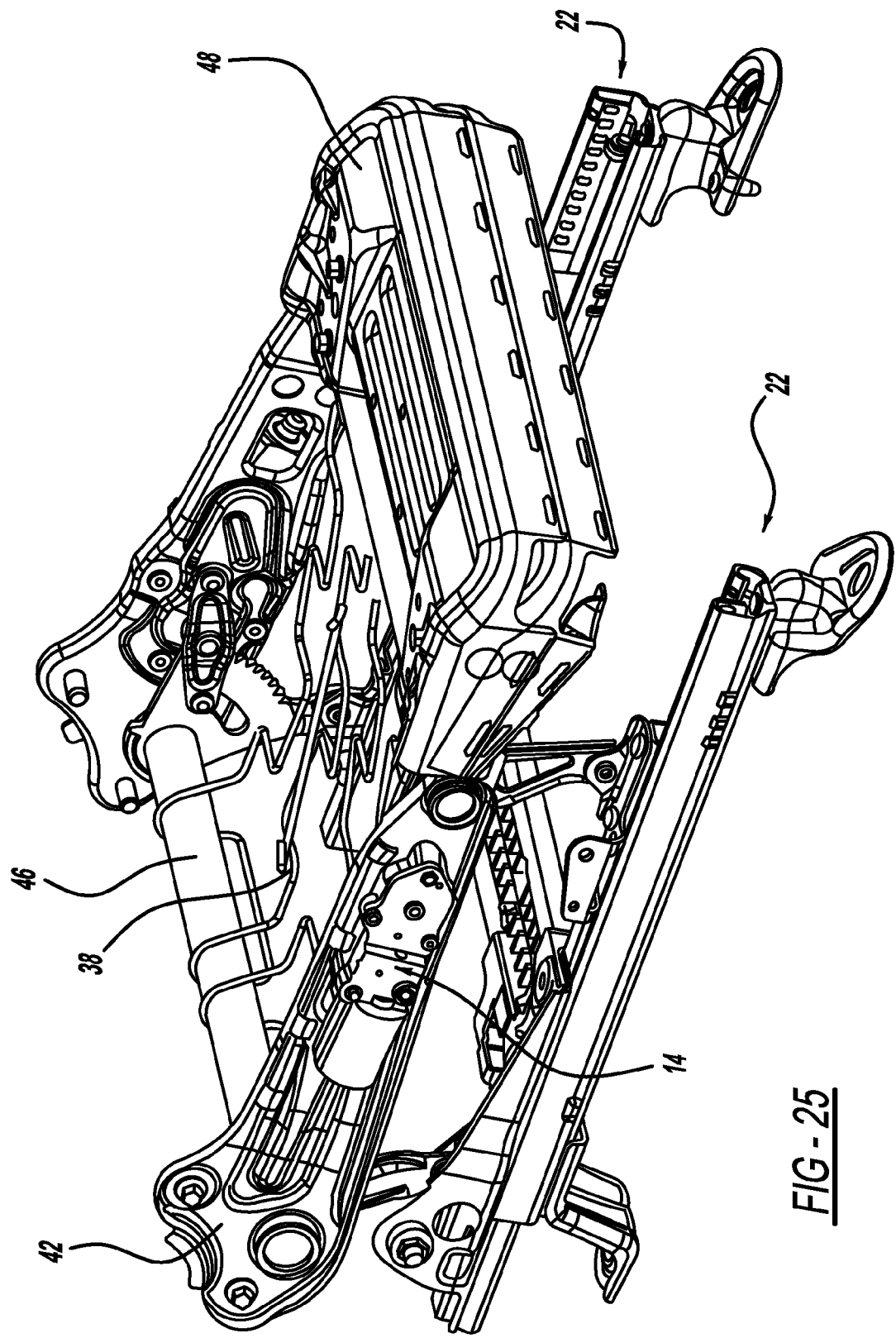
FIG. 25 is a perspective view of a seat adjuster in the full up position with the tilt pan shown in both the full up and full down positions.
Figure 26A:
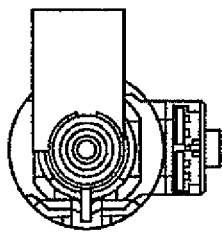
FIGS. 26A through 26F are a comparison of motors presently used in power seat adjusters for adjustment of thigh pressure.
Figure 26B:
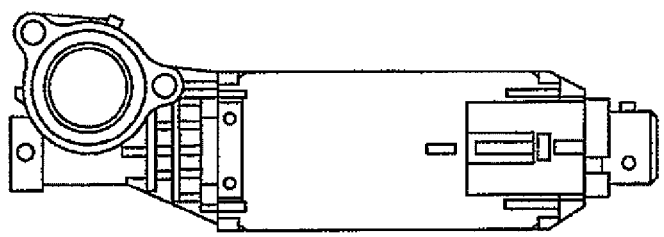
Figure 26C:
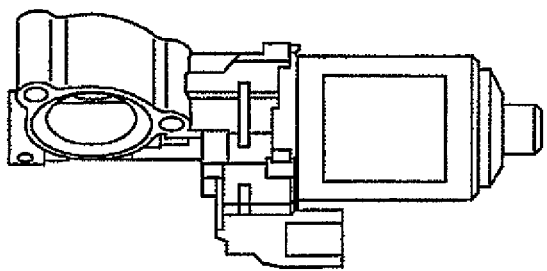
Figure 26D:
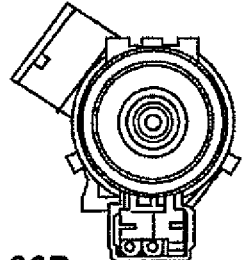
Figure 26F:
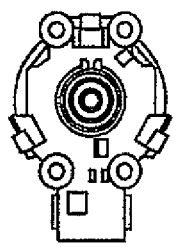
Figure 26E:
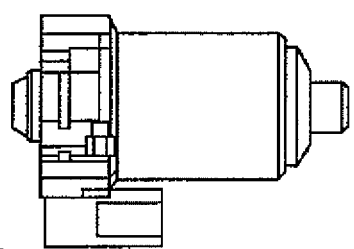

Referring now to FIGS. 21 through 23, the adjuster mechanism 14 of the exemplary embodiment disclosed adjusts the tilt member 52 between a first or design position as shown in FIG. 21, a second or full down position as shown in FIG. 22, and a third or full up position as shown in FIG. 23. To define the limits of travel of the adjuster mechanism 14 a shoulder bolt 102 is provided that passes through the central passage 72 in the sector 54 and is anchored in the side bracket member 42. The passage in the sector 72 and the shoulder bolt 102 are designed to define a first travel limit where a first end (or edge) of the passage of the sector 72 engages the shoulder bolt 102 and a second travel limit where a second end (or edge) of the passage of the sector 72 engages the shoulder bolt 102 to prevent further rotation of the tilt member 52 and the cross tube member 44. The shoulder bolt 102 also acts as over load protection for the transmission 76 as well as limiting the sector 54 from traveling in towards the occupant in case of vehicle impact.

The construction and arrangement of the elements of the vehicle seat and mechanisms as shown in the illustrated and other exemplary embodiments are intended to be illustrative. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter disclosed herein. For example, while the mechanism described herein is shown as being used in combination with a vehicle seat assembly, such a mechanism may also be suitable for use with assemblies used in other applications. Further, elements shown as integrally formed may be constructed of multiple parts or elements, the position of elements may be reversed or otherwise varied, and the nature or number of discrete elements or positions may be altered or varied. It should be noted that the elements and/or assemblies of the disclosed mechanism may be constructed from any of a wide variety of materials that provide sufficient strength or durability in any of a wide variety of colors, combinations and suitable materials. Other substitutions, modifications, changes and omissions may be made in the design, operating conditions and arrangement of the preferred and other exemplary embodiments disclosed without departing from the scope of the present disclosure which is limited solely by any patent claims.

What is claimed is:

1. A seat for use in a vehicle, the seat comprising:
   a seat base having spaced apart first and second side frame members;

a shaft interconnecting the first and second side frame members;

an adjuster mechanism for adjusting a portion of the seat base, the adjuster mechanism comprising a motor for generating torque and a transmission for transferring the torque from the motor to an output member;

a bracket coupled to the shaft for rotation of the bracket with respect to the side frame members, about an axis coincident with a longitudinal axis of the shaft, the bracket including a first end having teeth engaging the output member of the transmission wherein the adjuster mechanism includes a shoulder bolt passing through an opening in the bracket, and the shoulder bolt defines travel limits of the adjuster mechanism, such that a first travel limit prevents further rotation of the bracket in a first direction and a second travel limit prevents further rotation of the bracket in a second direction; and a front seat pan portion affixed directly to the bracket at a second end opposite the first end.

2. The vehicle seat of claim 1 wherein the seat pan portion extends between the first and second side members and is positioned toward the front portion of the seat base, and wherein the seat pan portion is designed for providing support proximal an occupant's lower thigh portion and is connected to the bracket such that the bracket causes the seat pan portion to tilt the seat base cushion.

3. The vehicle seat of claim 1 wherein a central portion of the bracket is coupled to the shaft.

4. The vehicle seat of claim 3 wherein the bracket and its sector member are located along an inboard side of the first side frame member and the adjuster mechanism is located along an outboard side of the first side frame member and are coupled together through a hole in the first side frame member.

5. The vehicle seat of claim 1 wherein the motor and the transmission assembly are arranged as an elongated package and are located in a recess located on an outboard side of the first side frame member.

6. The vehicle seat of claim 1 wherein a gear train transfers torque generated by the motor to a pinion gear via a worm gear and the pinion gear engages the teeth of the bracket to rotate the bracket.

7. The vehicle seat of claim 1 wherein the adjuster mechanism includes a shoulder bolt passing through a central passage of the bracket, the shoulder bolt being coupled to the first side member and extending there from.

8. A seat for use in a vehicle, the seat comprising:

a seat base having spaced apart first and second side frame members;

a shaft interconnecting the first and second side frame members;

an adjuster mechanism for adjusting a portion of the seat base, the adjuster mechanism comprising a motor for generating torque and a transmission for transferring the torque from the motor to an output member; and a bracket coupled to the shaft for rotation of the bracket with respect to the side frame members, wherein the adjuster mechanism includes a shoulder bolt passing through an opening in the bracket, and the shoulder bolt defines travel limits of the adjuster mechanism, such that a first travel limit is a first edge of the central passage of the bracket that engages the shoulder bolt to prevent further rotation of the bracket in a first direction and a second travel limit is a second edge of the central passage that engages the shoulder bolt and prevents further rotation of the bracket in the second direction.

9. A vehicle seat, the vehicle seat comprising:

a seat base having spaced apart first and second side frame members;

a shaft interconnecting the first and second side frame members; and an adjuster mechanism for adjusting a portion of the seat base, wherein the adjuster mechanism includes a motor for generating torque and a transmission for transferring torque from the motor to an output member;

a bracket coupled to the shaft for rotation of the bracket with respect to the side frame members around an axis coincident with a longitudinal axis of the shaft, and the bracket having a sector member with a plurality of teeth that are engaged by the output member wherein the adjuster mechanism includes a shoulder bolt passing through an opening in the bracket, and the shoulder bolt defines travel limits of the adjuster mechanism, such that a first travel limit prevents further rotation of the bracket in a first direction and a second travel limit prevents further rotation of the bracket in a second direction; and a front seat pan portion affixed to the bracket.

10. The vehicle seat of claim 9, in which the adjuster mechanism is aligned to have its axial extent aligned with and parallel to the axial extent of a side frame member.

11. The vehicle seat of claim 9, wherein the second side frame member includes a recess for housing the motor and a transmission assembly such that the motor and the transmission assembly are horizontally aligned end-to-end and positioned against the second side frame member.

12. The vehicle seat of claim 9 wherein the rotatable shaft is coupled to each of the first ends of each of the first and second side members such that a force due to an application of a load is directed into the rotatable shaft.

13. The vehicle seat of claim 9, wherein the transmission assembly includes a gear train having a plurality of gears with a large gear ratio to transfer torque from the motor to the rotatable shaft to thereby adjust a portion of the seat base.

14. The vehicle seat of claim 1, in which the adjuster mechanism is aligned to have its axial extent aligned with and parallel to the axial extent of a side frame member.

* * * * *